(12) United States Patent  (10) Patent No.: US 6,707,847 B1
Yoneyama  (45) Date of Patent: Mar. 16, 2004

(54) METHOD AND APPARATUS FOR DETECTING A SPREAD CODE FROM A PERCH CHANNEL

(75) Inventor: Koh Yoneyama, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 602 days.

(21) Appl. No.: 09/661,260

(22) Filed: Sep. 13, 2000

(30) Foreign Application Priority Data

Sep. 14, 1999 (JP) .......................................... 11-259705

(51) Int. Cl.⁷ .............................. H04K 1/00; H04B 7/26
(52) U.S. Cl. ....................................... 375/150; 370/342
(58) Field of Search ................................ 375/140, 142, 375/143, 145, 147, 149, 150, 152, 343; 370/320, 335, 342

(56) References Cited

U.S. PATENT DOCUMENTS

| 6,370,130 | B1 |   | 4/2002 | Zhou et al. |         |
|-----------|----|---|--------|-------------|---------|
| 6,487,237 | B1 | * | 11/2002 | Imaizumi ................... | 375/149 |
| 6,567,393 | B2 | * | 5/2003 | Hamalainen et al. ....... | 370/342 |

FOREIGN PATENT DOCUMENTS

| EP | 0 933 881 A2 | 8/1999 |
| JP | 9-116953 | 5/1997 |
| JP | 9-271071 | 10/1997 |
| JP | 11-127134 | 10/1997 |
| JP | 10-126378 | 5/1998 |
| JP | 2802870 | 7/1998 |
| JP | 2000-138657 | 8/1999 |
| JP | 2000-138615 | 5/2000 |

OTHER PUBLICATIONS

Nishio et al., Pub. No.: US 2002/0196871 A1, Pub. Date: Dec. 26, 2002.*
Proceedings of the 1999 IEICE General Conference, The Institute of Electronics, Information and Communication Engineers.

* cited by examiner

*Primary Examiner*—Young T. Tse
(74) *Attorney, Agent, or Firm*—Foley & Lardner (57) ABSTRACT

The method for detecting a spread code from a perch channel of the wide band CDMA (Code Division Multiple Access) by a perch channel detecting circuit, according to the present invention, comprises the steps of: detecting a spread timing from the perch channel; calculating correlative electric power values of a plurality of candidate spread code groups, based on the detected spread timing; comparing the correlative electric power values with a predetermined threshold value; selecting the spread code groups whose correlative electric power values are above the threshold value; and retrieving a spread code in the selected spread code group.

6 Claims, 7 Drawing Sheets

METHOD AND APPARATUS FOR DETECTING A SPREAD CODE FROM A PERCH CHANNEL

BACKGROUND OF THE INVENTION

1. Field of the Invention

The present invention relates to a method and apparatus for detecting a spread code from a perch channel of the wide band CDMA (Code Division Multiple Access) by a perch channel detecting circuit, and, in particular, to a method and apparatus for detecting a spread code from a perch channel which simplifies the timing control between base stations.

This application is based on Japanese Patent Application No. Hei 11-259705, the contents of which are incorporated herein by reference.

2. Description of the Related Art

In a perch channel detecting circuit, a conventional method and circuit for detecting a spread code perform timing control between base stations so that the spread timings for transmitting the perch channels do not overlap. Accordingly, the perch channel assigned to the base station can be uniquely determined, based on the spread timing detected using a known code.

Figure 5:
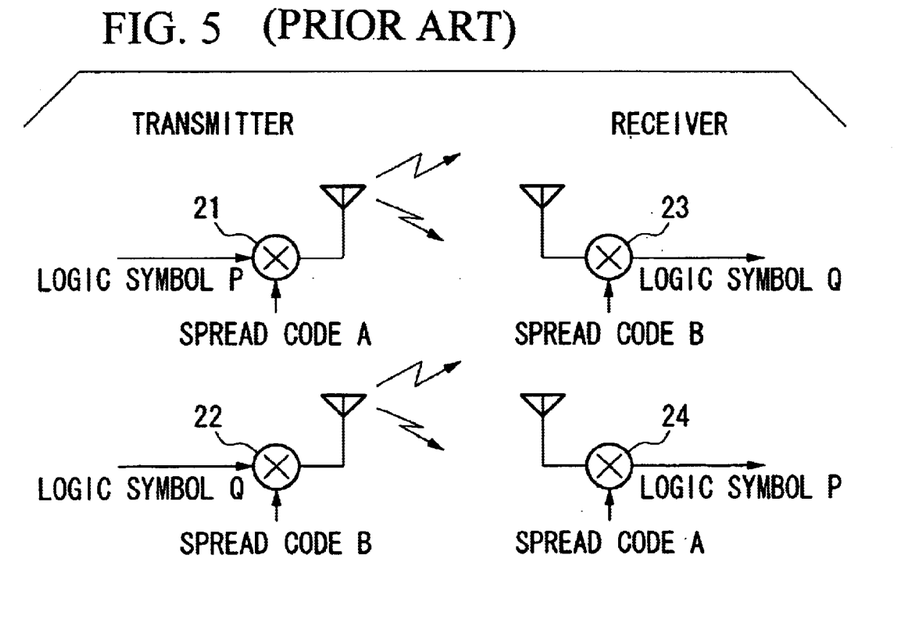
FIG. 5 is a diagram for explaining an example using a spread code for CDMA.

A CDMA transmitting/receiving system will be explained with reference to FIG. 5.

A transmitter which is a base station spreads a logic symbol P with a spread code A using a spreader 21, spreads a logic symbol Q with a spread code B using a spreader 22, and transmits them with carrier waves at the same frequency from an antenna. The transfer rate of the spread codes is several ten to hundred times of the transfer rate of the logic symbols. The cycle of the spread code is called a chip.

A receiver which is a mobile station despreads (inverse spreading) the received carrier waves with the spread code B using a despreader (inverse spreader) 23 to extract the logic symbol Q, and despreads the carrier waves with the spread code A using a despreader 24 to extract the logic symbol P.

The CDMA transmitting/receiving system cannot accurately carry out the dispreading when the receiver does not accurately know the spread timing used by the receiver which is the base station. For example, when the spread timings are different by one chip, the receiver cannot receive the signal transmitted from the base station.

Because there are a plurality of spread codes for respective base stations, the receiver cannot know the spread code used by the base station to which the receiver is to connect. When the receiver does not specify the spread code used by the base station, the receiver cannot receive any information from the base station. That is, the connection with the base station cannot be established, and communication is impossible.

A perch channel function solves this problem. The perch channel function allows the receiver to receive the base station information such as the spread code, with which the base station spreads the logic symbol, and the spread timing. According to the perch channel function, the receiver retrieves the perch channels, and can obtain various information of the base station, such as the spread code, and the spread timing. Thus, the receiver can achieve radio communication with the base station.

Since there are a number of spread codes, and the codes are long, it takes much time to detect the specified candidate spread code by despreading the signal with all the spread codes. To solve this problem, a number of the candidate spread codes are divided into a plurality of groups, which are called spread code groups, and one of the spread code groups is specified, thereby shortening the time required to detect the spread code.

In first step of the perch channel function, the spread timing is obtained, based on the known code. In second step, the spread code group in connection with the spread timing is obtained. In final third step, one of the spread codes in the obtained spread code group is obtained.

Figure 6:
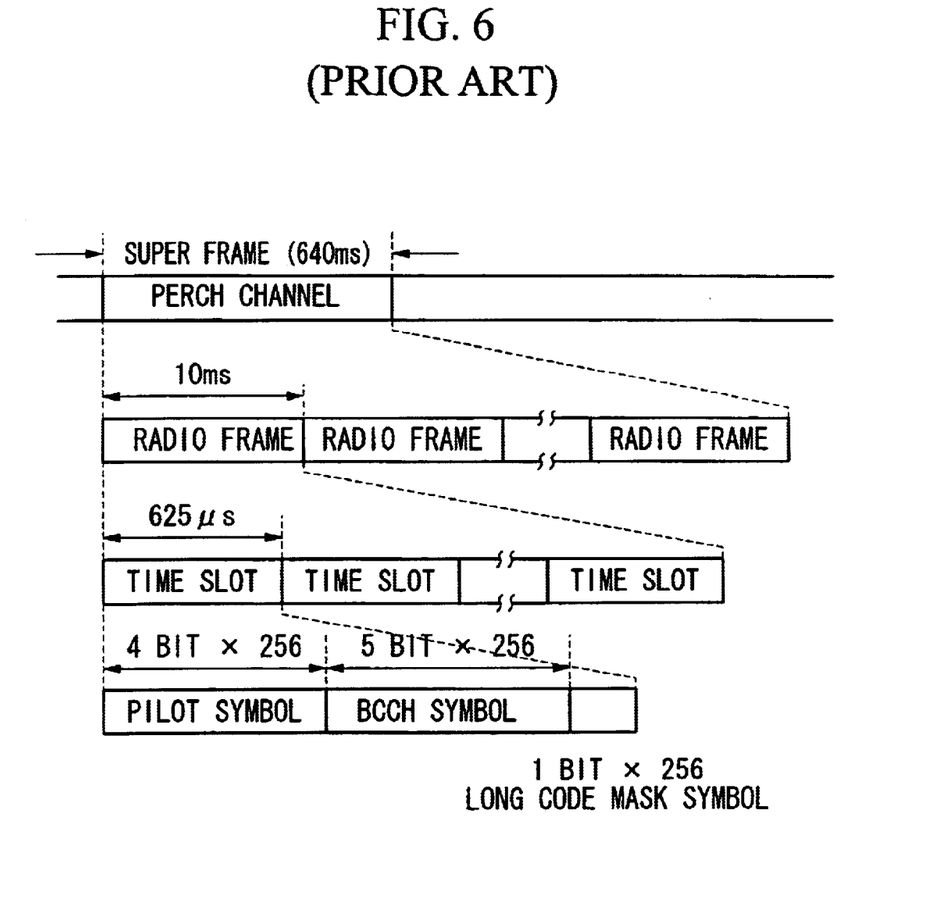
FIG. 6 is a diagram showing a format of a radio frame for CDMA.

Referring to FIG. 6, a special symbol, which is called a long code mask symbol, is spread, as the unique short code corresponding to the spread code group, in each time slot which is included in each radio frame in the perch channel. The information of the spread code group is obtained by detecting the spread short code of the symbol.

Figure 7:
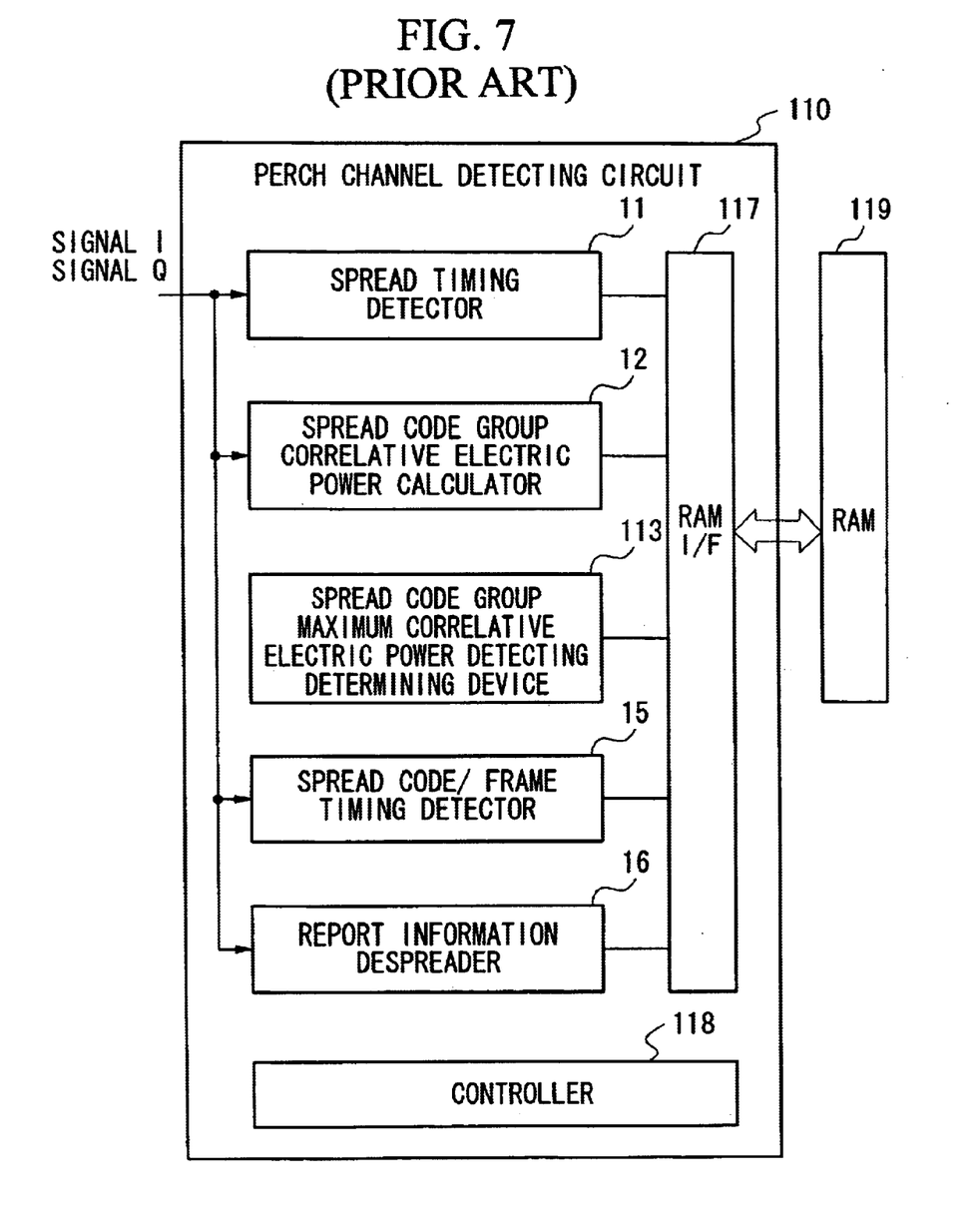
FIG. 7 is a block diagram showing a conventional technique.

Referring to FIG. 7, a conventional perch channel detecting circuit 110 comprises a spread timing detector 11, a spread code group correlative electric power calculator 12, a spread code group maximum correlative electric power detecting determining device 113, a spread code/frame timing detector 15, a report information despreader 16, a RAM I/F (RAM interface) 117, a controller 118 for controlling these devices, and a RAM (Random Access Memory) 119 which is an external storage device.

Figure 8:
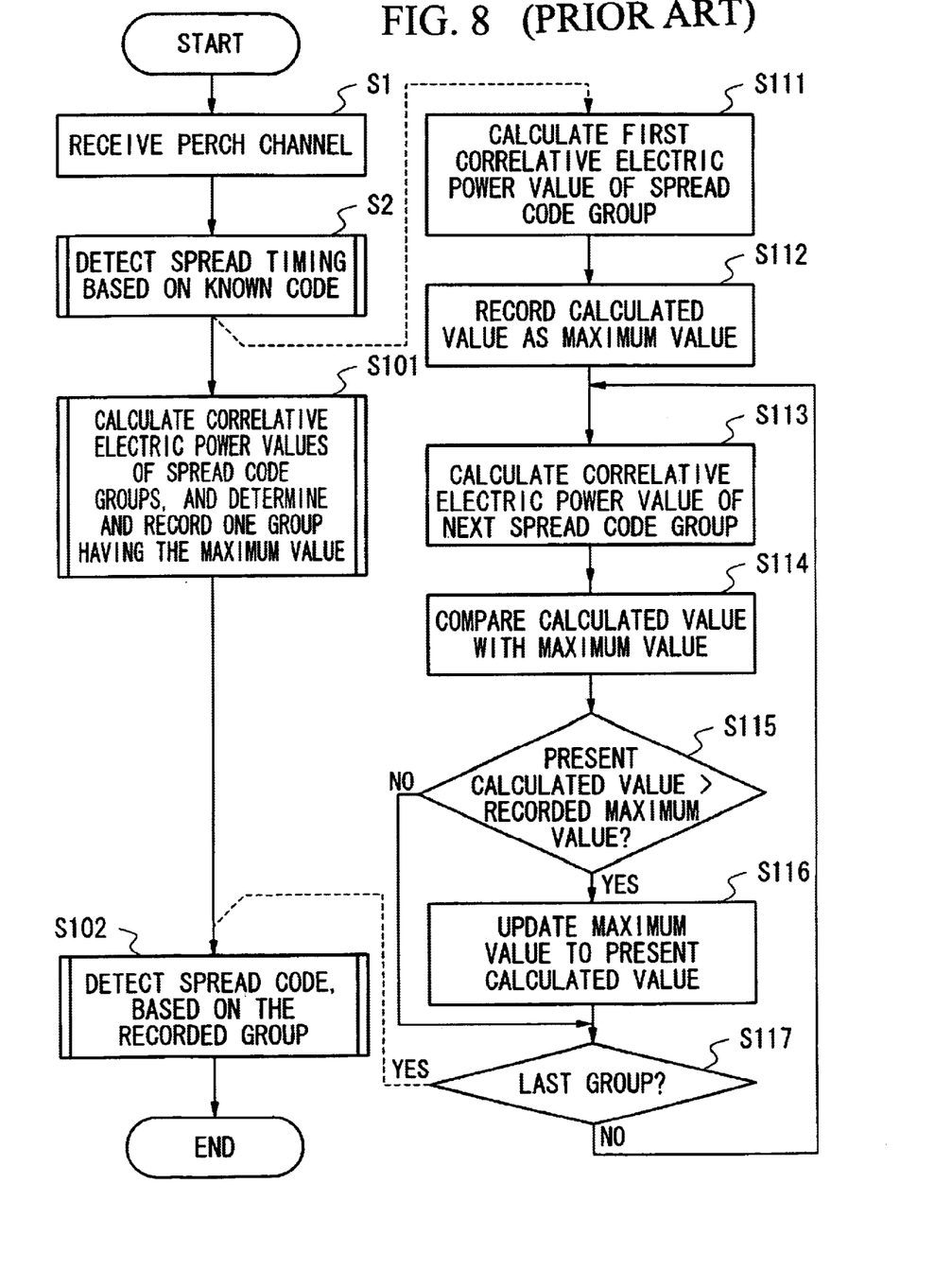
FIG. 8 is a flowchart showing the main operation of the conventional technique shown in FIG. 7.

Referring to the flowchart of FIG. 8, the spread timing detector 11 of the perch channel detecting circuit 110 receives the perch channel (step S1), and detects the spread timing with the known code by control of the controller 118 (step S2).

Subsequently, the spread code group correlative electric power calculator 12 calculates the correlative electric powers of a plurality of the candidate spread code groups by control of the controller 118. From the calculation results, the spread code group maximum correlative electric power detecting determining device 113 determines the candidate spread code group having the maximum correlative electric power as the detection object, and records it in the RAM 119 (step S101).

Subsequently, the spread code/frame timing detector 15 detects one of the spread codes which are included in the recorded candidate spread code group having the maximum correlative electric power by control of the controller 118 (step S102).

In another example of a process for determining a spread code group in FIG. 8, the correlative electric power of a first code group is calculated (step S111), and is recorded as the maximum value (step S112). Then, the correlative electric power of the next code group is calculated (step S113), and is compared with the maximum value (step S114). Then, when the determination in step S115 is YES, the maximum value is updated to the greater value (step S116). These steps are repeated until the process for the last spread code group is completed (until in step S117 the determination is YES).

The above-mentioned conventional perch channel circuit and method requires a particular timing control between the base stations, that is, must avoid the overlap of the spread timings for transmitting the perch channels assigned to the respective base stations.

The reason for this is that the correlative electric powers of the spread code groups are calculated, and that the spread code group having the maximum correlative electric power value is selected, to thereby uniquely determine the perch channel, which is assigned to the base station, with the spread timing which is firstly detected by the known code according to the perch channel function.

BRIEF SUMMARY OF THE INVENTION

It is therefore an object of the present invention to provide perch channel detecting circuit and method which can detect the spread codes even while the detected spread timings of the base stations overlap, eliminating the particular timing control between the base stations.

The method for detecting a spread code from a perch channel of the wide band CDMA (Code Division Multiple Access) by a perch channel detecting circuit, according to the present invention, comprises the steps of: detecting a spread timing from the perch channel; calculating correlative electric power values of a plurality of candidate spread code groups, based on the detected spread timing; comparing the correlative electric power values with a predetermined threshold value; selecting the spread code groups whose correlative electric power values are above the threshold value; and retrieving a spread code in the selected spread code group. The method may further comprises the steps of: extracting the calculated correlative electric power value of the candidate spread code group one by one; determining, one by one, whether the correlative electric power value of the candidate spread code group is above the threshold value; selecting the candidate spread code group when its correlative electric value is above the threshold value; aborting the candidate spread code group when its correlative electric value is not above the threshold value; repeating the determinations until the last candidate spread code groups; and proceeding to step of retrieving a spread code in the selected spread code group.

According to the method of the present invention, even when the same spread timing are used by neighboring base stations, the candidate spread code groups whose correlative electric power values are comparatively high but are not the maximum can be selected.

Specifically, the apparatus for detecting a spread code from a perch channel of wide band CDMA, according to the present invention, comprises: a spread timing detector for detecting a spread timing from the perch channel; a spread code group correlative electric power calculator for calculating correlative electric power values of a plurality of candidate spread code groups, based on the detected spread timing; a threshold value holder for holding a predetermined threshold value; a determining and recording device for determining and recording the spread code groups whose correlative electric power values are above the threshold value; and a spread code detector for detecting a spread code from the selected spread code groups.

DETAILED DESCRIPTION OF THE INVENTION

The embodiment of the present invention will be explained with reference to the figures.

Figure 1:
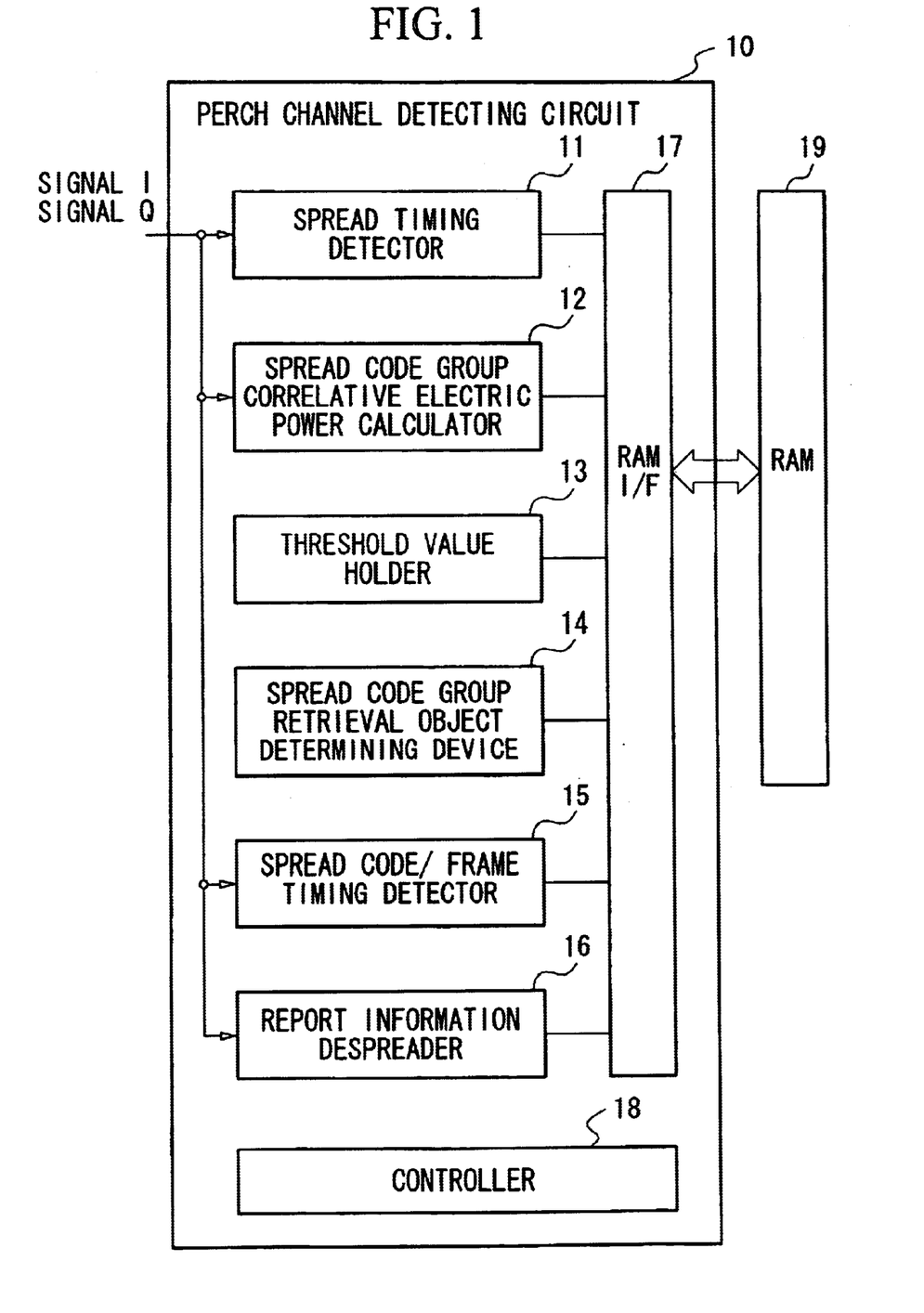
FIG. 1 is a block diagram showing the embodiment of the present invention.

FIG. 1 is a functional block diagram showing the embodiment of the present invention. The perch channel detecting circuit 10 comprises a spread timing detector 11, a spread code group correlative electric power calculator 12, a threshold value holder 13, a spread code group retrieval object determining device 14, a spread code/frame timing detector 15, a report information despreader 16, a RAM I/F (RAM interface) 17, a controller 18 for controlling these devices, and a RAM (Random Access Memory) 19 which is an external storage device. The threshold value holder 13 and the spread code group retrieval object determining device 14 are specially provided in the present invention.

The conventional technique shown in FIG. 7 selects and determines the maximum correlative electric power of the spread code group, whereas, in the present invention, a plurality of the correlative electric powers which exceed a threshold value held by the threshold value holder 13 are selected from among the correlative electric power values calculated by the spread code group correlative electric power calculator 12, and the spread code group retrieval object determining device 14 retrieves the spread code in the spread code groups having the selected correlative electric power values.

The spread timing detector 11, which is controlled by the controller 18, detects the spread timing of the perch channel of the base station, which is the object to be detected, using the known code. The spread code group correlative electric power calculator 12, which is controlled by the controller 18, conducts the despreading with a plurality of short codes corresponding to a plurality of candidate spread code groups, based on the spread timing detected by the spread timing detector 11, and receives and records all the correlative data of the candidate spread code groups. The correlative data contains the calculated correlative electric power values.

The threshold value holder 13 holds (stores) the preset threshold value for the correlative electric power values calculated by the spread code group correlative electric power calculator 12. The spread code group retrieval object determining device 14, which is controlled by the controller determines the candidate spread code groups, whose correlative electric power values exceed the threshold value, as the detection objects from which the spread codes are to be detected.

The spread code/frame timing detector 15, which is controlled by the controller 18, detects the spread codes of the respective spread code groups, which are the detection objects, and can obtain the frame timing of the base station, based on the detected spread codes. The report information despreader 16, which is controlled by the controller 18, obtains the report information, based on the spread code and the frame timing obtained by the spread code/frame timing detector 15.

Figure 2:
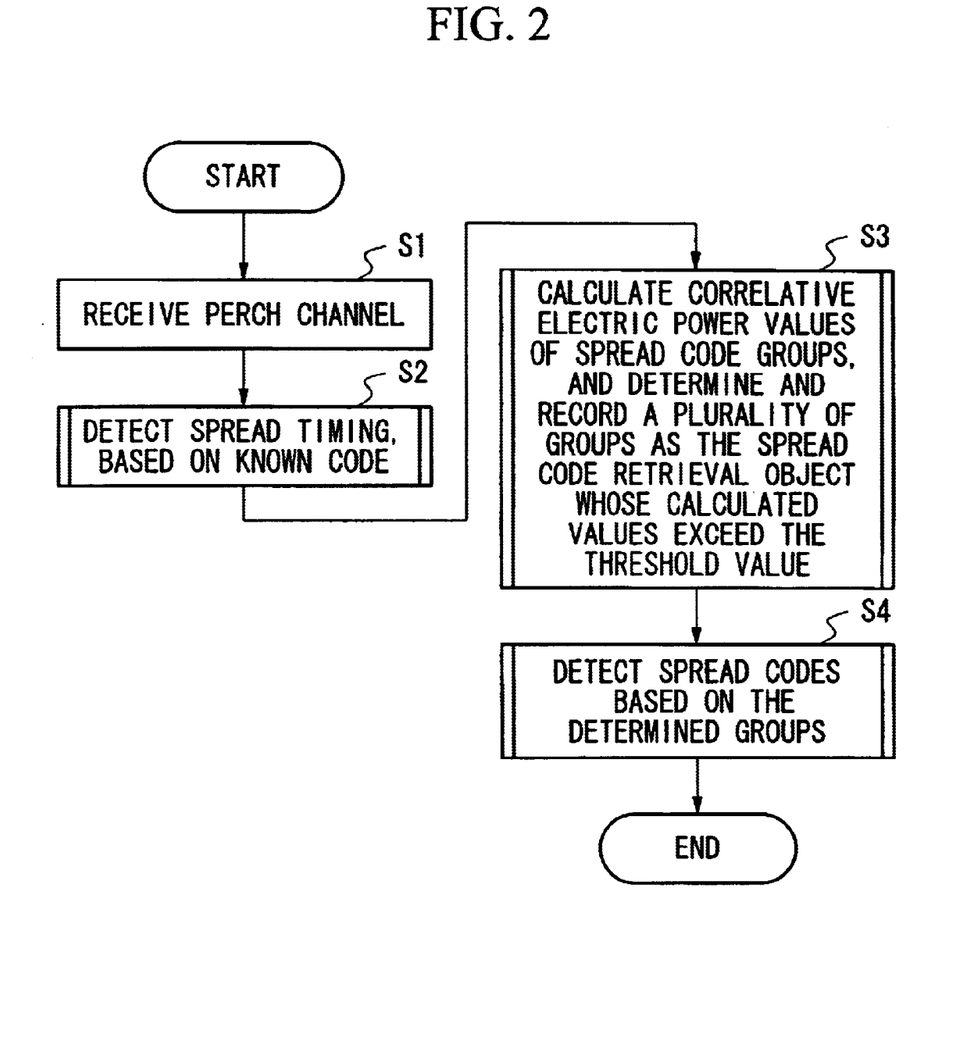
FIG. 2 is a flowchart showing the main operation of the embodiment of the present invention shown in FIG. 1.
Figure 3:
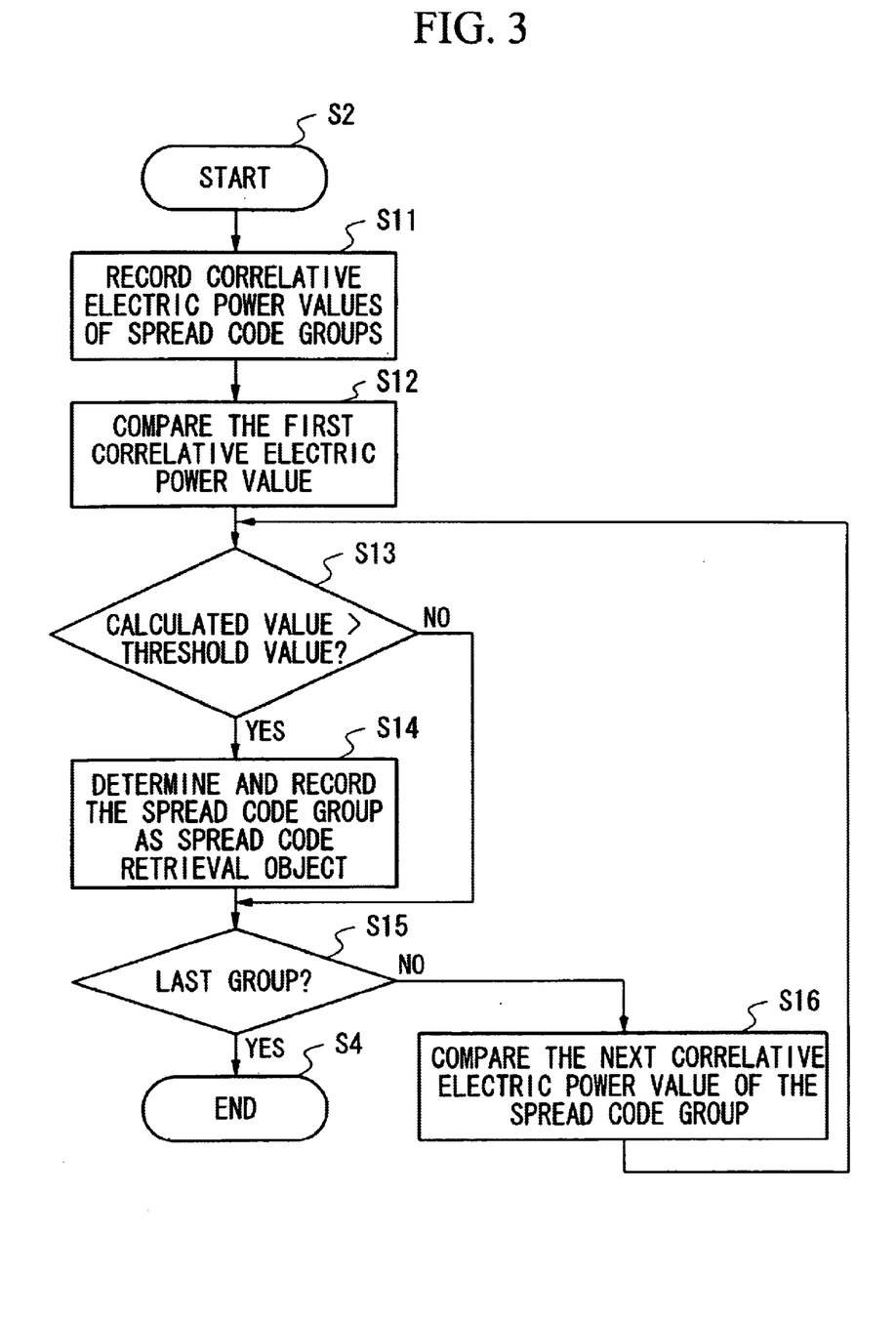
FIG. 3 is a flowchart showing in detail a part of the operation shown in FIG. 2.
Figure 4:
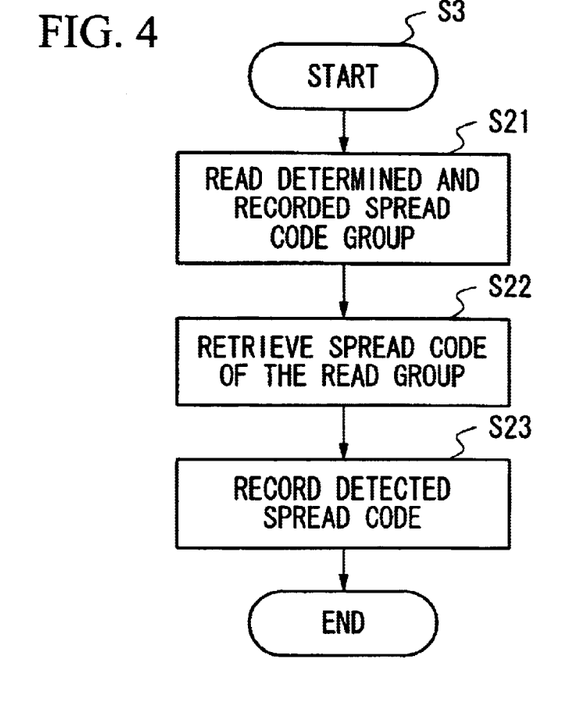
FIG. 4 is a flowchart showing in detail a part of the operation shown in FIG. 2.

The controller 18 is connected to the RAM 19 via the above-described portions and the RAM I/F 17, and successively executes the functions while sending and receiving data and information. The main process will be explained with reference to FIG. 2. FIG. 3 and FIG. 4 are flowcharts showing the details of steps shown in FIG. 2.

In the above-described structural portions and the following description, a functional block or process for handling an abnormal condition is omitted because the block or process is not directly related to the present invention.

The main process of the perch channel detecting circuit 10 will be explained with reference to FIGS. 1 and 2.

The controller 18 drives the spread timing detector 11 to receive the perch channel (step S1). The spread timing detector 11 detects the spread timing of the base station from the received perch channel with the known code (step S2).

Next, to select the retrieval objects to retrieve the spread code, the controller 18 directs the spread code group correlative electric power calculator 12, the threshold value holder 13, and the spread code group retrieval object determining device 14 to determine and record a plurality of the spread code groups having the correlative electric power value greater than the preset threshold value (step S3). The determined and recorded spread code groups contain having the same spread timing of the perch channels from the periphery base stations.

The controller 18 sends the determined and recorded spread code groups to the spread code/frame timing detector 15, which then detects the spread codes from among the candidate spread codes (step S4). Thus, the spread code to be applied is determined.

As described above, even when in step S2 the spread timing of the perch channel of the base station is detected by the known code, another base station having the same spread timing may exist at the periphery. In this situation, both the correlative electric power values of the candidate spread code groups are close to the maximum value. Step S3 determines a plurality of spread code groups which includes the group having the maximum correlative electric power value, and the other groups having the correlative electric power values close to the maximum value which exceed the preset threshold value. Therefore, even when the spread timings of two or more base stations are the same, step S4 can determine the respective spread codes to be applied.

The example of step S3 will be explained with reference to FIG. 3 in addition to FIGS. 1 and 2.

The controller 18 sends the spread timing, which was detected by the spread timing detector 11, to the spread code group correlative electric power calculator 12, which then despreads a plurality of the candidate spread code groups with the corresponding short codes, calculates the correlative electric power values of the respective candidate spread code groups, and records the values in the RAM 19 (step S11). Subsequently, the controller 18 directs the spread code group retrieval object determining device 14 to extract the correlative electric power value of the firstly recorded candidate spread code group (step S12), and to compare it with the threshold value stored in the threshold value holder 13 (step S13).

When in step S13 the determination is YES, that is, when the correlative electric power value of the candidate spread code group is above the threshold value, the controller 18 determines the spread code group as the object from which the spread code is to be retrieved, and records the candidate spread code group in the RAM 19 (step S14).

After step S14, or when in step S13 the determination is NO, that is, when the correlative electric power value of the candidate spread code group is below the threshold value, as long as the candidate spread code group is not the last (when in step S15 the determination is NO), the controller 18 directs the spread code group retrieval object determining device 14 to extract the correlative electric power value of the next candidate spread code group (step S16), and the flow returns to step S13 to compare it with the threshold value stored in the threshold value holder 13

When in step S15 the determination is YES, and when there is no remaining correlative electric power value, the flow proceeds to step S4, and the spread code is detected, based on the spread code groups which were determined and recorded in step S14.

The example of step S4 will be explained with reference to FIG. 4 in addition to FIGS. 1 and 2.

The controller 18 reads the spread code groups which were determined and recorded in step S14 (step S21), sends them to the spread code/frame timing detector 15, and directs the spread code/frame timing detector 15 to retrieve the spread code (step S22). The detected spread codes are recorded in the RAM 19 (step S23). When the processes for all the determined spread code groups are completed, the flow proceeds to step of detecting the frame timing by the spread code by the spread code/frame timing detector 15.

While in the above description the threshold value is stored in the threshold value holder in advance, the threshold value may be stored in the RAM. While the RAM is the external storage device, the RAM may be an internal device. Further, a register may be used instead of the RAM as the storage device. While in the above description the spread code group correlative electric power calculator and the spread code/frame timing detector receive the spread code group one by one from the controller, calculate the correlative electric power value, and detect the spread code, the candidate spread code groups, or the determined and recorded spread code groups may be received at the same time, thereby shortening the processing time.

While, in the above description, the present invention is explained with reference to the functional blocks and the flowcharts, some of the functions may be separated or integrated, and steps may be carried out in a parallel manner, as long as the same functions are provided.

As described above, the present invention eliminates the timing control between the base stations. When a plurality of base stations overlap in the detected spread timing, the respective spread codes can be detected.

This advantage is achieved because, when executing the perch channel function, the candidate spread code groups having the correlative electric power values which exceeds the predetermined threshold value are selected and determined. The same number of the spread code groups as the base stations which are obtained from the perch channel and which have the same spread timing can be determined.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A method for detecting a spread code from a perch channel of the wide band CDMA (Code Division Multiple Access) by a perch channel detecting circuit, comprising the steps of:

detecting a spread timing from the perch channel;

calculating correlative electric power values of a plurality of candidate spread code groups, based on the detected spread timing;

comparing the correlative electric power values with a predetermined threshold value;

selecting the spread code groups whose correlative electric power values are above the threshold value; and retrieving a spread code in the selected spread code groups.

2. A method according to claim 1, further comprising the steps of:

extracting the calculated correlative electric power values of the candidate spread code groups one by one;

determining, one by one, whether the correlative electric power values of the candidate spread code groups are above the threshold value;

selecting the candidate spread code groups when their correlative electric values are above the threshold value;

aborting the candidate spread codes group when their correlative electric values are not above the threshold value;

repeating the determinations until the last candidate spread code group; and proceeding to the step of retrieving the spread code in the selected spread code groups.

3. An apparatus for detecting a spread code from a perch channel of wide band CDMA, comprising a spread timing detector for detecting a spread timing from the perch channel;

a spread code group correlative electric power calculator for calculating correlative electric power values of a plurality of candidate spread code groups, based on the detected spread timing;

a threshold value holder for holding a predetermined threshold value;

a determining and recording device for determining and recording the spread code groups whose correlative electric power values are above the threshold value; and a spread code detector for detecting a spread code from the selected spread code groups.

4. An apparatus according to claim 3, wherein the spread code group correlative electric power calculator calculates the correlative electric power values of the candidate spread code groups one by one, and the determining and recording device determines and records, one by one, the spread code groups whose correlative electric power values are above the threshold value.

5. An apparatus according to claim 3, further comprising:

a frame timing detector for detecting a frame timing from the selected spread code groups;

a report information despreader for despreading an input signal, based on the detected spread code and the detected frame timing, to obtain report information.

6. An apparatus according to claim 5, wherein the determining and recording device determines and records, one by one, the spread code groups whose correlative electric power values are above the threshold value, the spread code detector detects the spread code from the selected spread code groups one by one, and the frame timing detector detects the frame timing from the selected spread code groups one by one.

* * * * *